United States Patent
Rathonyi et al.

(10) Patent No.: US 10,904,925 B2
(45) Date of Patent: Jan. 26, 2021

(54) METHOD FOR PROVIDING CONTENTION-FREE RANDOM ACCESS RESOURCES FOR NB-IOT

(71) Applicant: TELEFONAKTIEBOLAGET LM ERICSSON (PUBL), Stockholm (SE)

(72) Inventors: Béla Rathonyi, Lomma (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 16/307,685

(22) PCT Filed: Jun. 8, 2017

(86) PCT No.: PCT/IB2017/053406
§ 371 (c)(1),
(2) Date: Dec. 6, 2018

(87) PCT Pub. No.: WO2017/212443
PCT Pub. Date: Dec. 14, 2017

(65) Prior Publication Data
US 2019/0306887 A1 Oct. 3, 2019

Related U.S. Application Data

(60) Provisional application No. 62/347,584, filed on Jun. 8, 2016.

(51) Int. Cl.
*H04W 74/08* (2009.01)
*H04W 72/04* (2009.01)
(Continued)

(52) U.S. Cl.
CPC ....... *H04W 74/0833* (2013.01); *H04L 5/0012* (2013.01); *H04L 5/0094* (2013.01);
(Continued)

(58) Field of Classification Search
None
See application file for complete search history.

(56) References Cited

U.S. PATENT DOCUMENTS

2017/0070274 A1\* 3/2017 Lim ..................... H04B 7/0617
2017/0094680 A1\* 3/2017 Patel ................. H04W 72/1284
(Continued)

OTHER PUBLICATIONS

Ericsson. "Narrowband IoT—Random Access Design." 3GPP TSG-RAN WG1#83 R1-157424, Nov. 22, 2015, Section 2, Section 3, www.3gpp.org/ftp/tsg_ran/WG1_RL1/TSGR1_83/Docs/R1-157424.zip.
(Continued)

*Primary Examiner* — Eunsook Choi

(57) ABSTRACT

A method (800) in a network node (115) comprises reserving (804), within a Narrowband Physical Random Access Channel (NPRACH) resource (305, 405, 505, 605, 705) comprising a plurality of start subcarriers, a subset of the plurality of start subcarriers for performing a contention-free random access procedure (310, 410, 520, 530, 610, 720, 730). The method comprises communicating (804), to one or more user equipment (UEs) (110), information indicating which of the plurality of start subcarriers within the NPRACH resource are reserved for performing the contention-free random access procedure.

28 Claims, 14 Drawing Sheets

(51) Int. Cl.
*H04L 5/00* (2006.01)
*H04L 29/08* (2006.01)

(52) U.S. Cl.
CPC ....... *H04W 72/0453* (2013.01); *H04L 5/0053* (2013.01); *H04L 67/12* (2013.01)

(56) References Cited

U.S. PATENT DOCUMENTS

| | | | |
|---|---|---|---|
| 2017/0279582 A1* | 9/2017 | Lee | H04L 5/0048 |
| 2018/0076946 A1* | 3/2018 | Li | H04L 5/0053 |
| 2019/0037562 A1* | 1/2019 | Park | H04L 5/0048 |
| 2019/0068427 A1* | 2/2019 | Hwang | H04L 5/0053 |
| 2019/0090284 A1* | 3/2019 | Kang | H04L 5/0044 |
| 2019/0274168 A1* | 9/2019 | Hwang | H04L 5/0012 |

OTHER PUBLICATIONS

Samsung Electronics Co., Ltd. "Discussion on Random Access Procedure." 3GPP TSG-RAN WG2#91bis R2-154531, Oct. 9, 2015, Section 2, www.3gpp.org/ftp/tsg_ran/WG2_RL2/TSGR2_91bis/Docs/R2-154531.zip.

Ericsson: "Random access for NB-IOT", 3GPP Draft: R2-160470—Random Access for NB-IoT, 3rd Generation Partnership Project (3GPP).

Ericsson: "NB-IoT Random access", 3GPP Draft: R1-160278—NB-IOT—Random Access, 3rd Generation Partnership Project (3GPP).

Ericsson: "Nb-IoT Remaining issues for random access procedure", 3GPP Draft: R1-161836—NB-IOT—Issues for Random Access Procedure, 3rd Generation Partnership Project (3GPP).

Ericsson: "NB-IoT—NPRACH Configurations", 3GPP Draft: R1-161835—NB-IOT-NPRACH Configurations, 3rd Generation Partnership Project (3GPP).

Ericsson: "NB-IoT—NPRACH Sequences", 3GPP Draft: R1-161834, 3rd Generation Partnership Project (3GPP).

* cited by examiner

METHOD FOR PROVIDING CONTENTION-FREE RANDOM ACCESS RESOURCES FOR NB-IOT

This application is a 371 of International Application No. PCT/IB2017/053406, filed Jun. 8, 2017, which claims the benefit of U.S. Provisional Application No. 62/347,584 filed Jun. 8, 2016, the disclosures of which are fully incorporated herein by reference.

TECHNICAL FIELD

The present disclosure relates, in general, to wireless communications and, more particularly, to providing contention-free random access resources for NB-IOT.

BACKGROUND

In modern cellular radio systems, the radio network has a strict control on the behavior of the user equipment (UE) (which may be interchangeably referred to herein as a wireless device or a terminal). Uplink (UL) transmission parameters like frequency, timing, and power are regulated via downlink (DL) control signaling from the base station to the terminal. For instance, by time-aligning the UL transmissions, orthogonality between UEs can be achieved in the time domain. This is necessary since the radio resources are scarce.

At power-on or after a long standby time, the UE is not synchronized in the UL. The UE can derive an UL frequency and power estimate from the DL signals (e.g., DL control signals). However, a timing estimate is difficult to make because the round-trip propagation delay between the network node (e.g., a base station such as an eNodeB (eNB)) and the UE is unknown. So even if the UE UL timing is synchronized to the DL, it may arrive too late at the network node receiver because of the propagation delays. Therefore, before commencing traffic, the UE has to carry out a random access procedure to the network. After the random access procedure, the network node can estimate the timing misalignment of the UE UL and send a correction message.

FIG. 1 is a signal flow diagram of an example random access procedure 10. More particularly, FIG. 1 illustrates an example random access procedure between a UE 110 and a network node 115 (e.g., an eNB). At step 10-1, UE 110 sends a random access preamble to network node 115. This is illustrated in the example of FIG. 1 as a Msg1: RA Preamble. Usually, a Physical Random Access Channel (PRACH) is provided for the UE to request access to the network. A random access preamble is used that is based on a specific sequence with good auto-correlation. Typically, a UE performing random access randomly picks a preamble out of a pool and transmits it. The preamble represents a random UE ID that can be used by the network node when granting the UE access to the network. To distinguish between different UEs performing random access, typically many different preambles exist.

At step 10-2, network node 115 sends a random access Response message to UE 110. The network node receiver listens at all random access opportunities to detect preambles. In case a preamble is successfully detected, a random access Response that includes the number of the detected preamble is sent in a special message on the DL. This is illustrated in the example of FIG. 1 as a Msg2: RA Response. The random access Response may include, for example, information related to a Timing Advance, an UL grant, as well as any other suitable information. A UE that has recently performed a random access attempt will listen within a certain time window after the preamble has been sent to receive a random access Response. If the UE successfully receives the random access Response, the UE continues with Steps 10-3 and 10-4 of the random access procedure as shown in FIG. 1 and described in more detail below. If no random access Response is received within the specified window, a new attempt is made.

The time windows for receiving an random access Response pertaining to different occasions of PRACH (which is periodic) may overlap. To enable identification of which random access response pertains to which occasion of PRACH, each PRACH occasion/period is associated with a Random Access Radio Network Temporary Identifier (RA-RNTI). The random access Response transmission is addressed to the RA-RNTI associated with the corresponding PRACH occasion.

In the example of FIG. 1, UE 110 successfully receives the random access Response message. At step 10-3, UE 110 sends a random access Message 3 to network node 115. This is illustrated in the example of FIG. 1 as a Msg3: RA Message 3. The random access Message 3 may include, for example, information related to a UE Identity, a Buffer Status Report (BSR), as well as any other suitable information.

At step 10-4, network node 115 sends a random access Contention Resolution message to UE 110. This is illustrated in the example of FIG. 1 as Msg4: RA Contention Resolution. The random access Contention Resolution may include, for example, information related to an UL grant and/or DL assignment. Because multiple UEs can request access at the same time, collisions may occur between requesting UEs. A contention resolution scheme is therefore implemented to separate the UE transmissions. As described above, typically many different preambles exist to distinguish between different UEs performing random access. The network node receiver can resolve random access attempts performed with different preambles and send a response message to each UE using the corresponding random UE IDs. If the contention resolution procedure is successful, at step 10-5 UE 110 and network node 115 may perform further UL/DL transmissions.

In cases where multiple UEs simultaneously use the same preamble, a collision occurs. In such a scenario, the random access attempts are likely not successful. This is because the network node cannot distinguish between the two users with the same random UE ID. To minimize the probability of collision, the set of available sequences should be large.

In Narrowband Internet-of-Things (NB-IoT), the random access procedure includes transmitting a random access preamble sequence on subcarriers on a Narrowband Physical Random Access Channel (NPRACH). One to three NPRACH resources can be configured in a cell. An NPRACH resource contains a set of 12, 24, 36 or 48 subcarriers defining 1, 2, 3 or 4 sets of 12 subcarriers, respectively. Each set may optionally be split into 2 partitions for single/multi-tone Msg3 transmission. In addition, each NPRACH resource is associated with a repetition level (i.e., the number of repetitions of the Msg1/preamble transmission). The Medium Access Control (MAC) layer in the UE selects the start subcarrier as part of the random access procedure. In some cases, the start subcarrier is selected randomly from the set of configured subcarriers. In other cases, the UE selects and uses a signaled subcarrier received in a Physical Downlink Control Channel (PDCCH) order.

After this selection, the MAC layer informs the physical layer that starts the Msg1 transmission on the selected subcarrier and then applies frequency hopping between subcarriers from the configured set if the repetition level is larger than one (according to the frequency hopping rules specified in section 10.1.6 of R1-165963 ("Introduction of NB-IoT in 36.211," CR0224 rev7, Ericsson, 2016 Jun. 3). The frequency hopping is performed over 12 subcarriers within a 12-subcarrier subset of the NPRACH. In some cases, the transmission can be characterized by the starting subcarrier of the hopping sequence. The start subcarrier may also be referred to as the start subcarrier index or subcarrier index of the preamble transmission. An NPRACH can be configured with 12, 24, 36 or 48 subcarriers providing 12, 24, 36 or 48 different preambles, subcarriers, and/or preamble subcarrier hopping sequences (which may collectively be referred to herein as "preambles/subcarriers/preamble subcarrier hopping sequences") characterized by their start subcarrier indices. When performing random access, a UE chooses randomly one of the configured preambles/subcarriers/preamble subcarrier hopping sequences.

For NB-IoT UEs, the RA-RNTI associated with the NPRACH occasion in which the random access preamble/subcarrier/preamble subcarrier hopping sequence is transmitted, is computed as:

$$RA\text{-}RNTI = 1 + SFN\_id/4,$$

where SFN_id is the index of the first radio frame of the specified NPRACH.

NPRACH is configured with the NPRACH-ConfigSIB-NB Information Element (IE) in the Radio Resource Control (RRC) protocol as described in R2-164573 ("Introduction of NB-IoT in 36.331," CR2231 rev6, Huawei, 2016 Jun. 7) (hereinafter "R2-164573"). The IE NPRACH-ConfigSIB-NB is used to specify the NPRACH configuration in the system information (SI). The NPRACH-ConfigSIGN-NB IEs and their respective field descriptions are shown below:

| NPRACH-ConfigSIB-NB information elements |
|---|
| -- ASN1START |
| NPRACH-ConfigSIB-NB-r13 ::=    SEQUENCE { |
|     nprach-CP-Length-r13        ENUMERATED {us66dot7, us266dot7}, |
|     rsrp-ThresholdsPrachInfoList-r13    RSRP-ThresholdsNPRACH-InfoList-NB-r13    OPTIONAL, -- need OR |
|     nprach-ParametersList-r13        NPRACH-ParametersList-NB-r13 |
| } |
| NPRACH-ParametersList-NB-r13 ::=    SEQUENCE {SIZE (1.. maxNPRACH-Resources-NB-r13)} OF NPRACH-Parameters-NB-r13 |
| NPRACH-Parameters-NB-r13::=    SEQUENCE { |
|     nprach-Periodicity-r13        ENUMERATED {ms40, ms80, ms160, ms240, ms320, ms640, ms1280, ms2560}, |
|     nprach-StartTime-r13        ENUMERATED {ms8, ms16, ms32, ms64, ms128, ms256, ms512, ms1024}, |
|     nprach-SubcarrierOffset-r13        ENUMERATED {n0, n12, n24, n36, n2, n18, n34, spare1}, |
|     nprach-NumSubcarriers-r13        ENUMERATED {n12, n24, n36, n48}, |
|     nprach-SubcarrierMSG3-RangeStart-r13 ENUMERATED {zero, oneThird, twoThird, one}, |
|     maxNumPreambleAttemptCE-r13    ENUMERATED {n3, n4, n5, n6, n7, n8, n10, spare1}, |
|     numRepetitionsPerPreambleAttempt-r13 ENUMERATED {n1, n2, n4, n8, n16, n32, n64, n128}, |
|     npdcch-NumRepetitions-RA-r13    ENUMERATED {r1, r2, r4, r8, r16, r32, r64, r128, r256, r512, r1024, r2048, spare4, spare3, spare2, spare1}, |
|     npdcch-StartSF-CSS-RA-r13        ENUMERATED {v1dot5, v2, v4, v8, v16, v32, v48, v64}, |
|     npdcch-Offset-RA-r13        ENUMERATED {zero, oneEighth, oneFourth, threeEighth} |
| } |
| RSRP-ThresholdsNPRACH-InfoList-NB-r13 ::= SEQUENCE {SIZE(1..2)} OF RSRP-Range |
| -- ASN1STOP |

| NPRACH-ConfigSIB-NB field descriptions |
|---|
| maxNumPreambleAttemptCE |
| Maximum number of preamble transmission attempts per NPRACH resource. See TS 36.321 [6]. |
| npdcch-NumRepetitions-RA |
| Maximum number of repetitions for NPDCCH common search space (CSS) for RAR, Msg3 retransmission and Msg4, see TS 36.211 [21]. |
| npdcch-Offset -RA |
| Fractional period offset of starting subframe for NPDCCH common search space (CSS Type 2, see TS 36.211 [21] and TS 36.213 [23]. |
| npdcch-StartSF-CSS-RA |
| Starting subframe configuration for NPDCCH common search space (CSS), including RAR, Msg3 retransmission, and Msg4, see TS 36.211 [21] and TS 36.213 [23]. |
| nprach-CP-Length |
| Cyclic prefix length for NPRACH transmission, see TS 36.211 [21, 5.2.1]. Value us66dot7 corresponds to 66.7 microseconds and value us266dot7 corresponds to 266.7 microseconds. |
| nprach-NumSubcarriers |
| Number of sub-carriers in a NPRACH resource. In number of subcarriers |
| nprach-ParametersList |

| NPRACH-ConfigSIB-NB field descriptions |
| --- |
| Configures NPRACH parameters for each NPRACH resource. Up to three PRACH resources can be configured in a cell. Each NPRACH resource is associated with a different number of NPRACH repetitions.<br>nprach-Periodicity<br>Periodicity of a NPRACH resource. Unit in millisecond.<br>nprach-StartTime<br>Start time of the NPRACH resource in one period. Unit in millisecond.<br>nprach-SubcarrierOffset<br>Frequency location of the NPRACH resource. In number of subcarriers, offset from sub-carrier 0.<br>nprach-SubcarrierMSG3-RangeStart<br>Fraction for calculating the starting subcarrier index of the range reserved for indication of UE support for multi-tone Msg3 transmission, within the NPRACH resource.. Multi-tone Msg3 transmission is not supported for {32, 64, 128} repetitions of NPRACH. For at least one of the NPRACH resources with the number of NPRACH repetitions other than {32, 64, 128}, the value of nprach-SubcarrierMSG3-RangeStart_should be less than 1.<br>numRepetitionPerPreambleAttempt<br>Number of NPRACH repetitions per attempt for each NPRACH resource, See TS 36.211 [21]<br>rsrp-ThresholdsPrachInfoList<br>The criterion for UEs to select a NPRACH resource. Up to 2 RSRP threshold values can be signalled. See TS 36.213 [23]. The first element corresponds to RSRP threshold 1, the second element corresponds to RSRP threshold 2. See TS 36.321 [6].<br>If absent, there is only one NPRACH resource. |

SUMMARY

To address the foregoing problems with existing solutions, disclosed is a method in a network node. The method comprises reserving, within a Narrowband Physical Random Access Channel (NPRACH) resource comprising a plurality of start subcarriers, a subset of the plurality of start subcarriers for performing a contention-free random access procedure. The method comprises communicating, to one or more user equipment (UEs), information indicating which of the plurality of start subcarriers within the NPRACH resource are reserved for performing the contention-free random access procedure.

In certain embodiments, the method may comprise communicating, to a first UE, an instruction to use a particular one of the reserved start subcarriers for performing the contention-free random access procedure. In certain embodiments, each of the plurality of start subcarriers within the NPRACH resource may be a first subcarrier for a subcarrier hopping sequence.

In certain embodiments, the information indicating which of the plurality of start subcarriers within the NPRACH resource are reserved for performing the contention-free random access procedure may comprise a number of start subcarriers within the NPRACH resource that are not reserved for performing the contention-free random access procedure. The start subcarriers within the NPRACH resource that are not reserved for performing the contention-free random access procedure may be available for performing a contention-based random access procedure. In certain embodiments, the information may be signaled as part of a radio resource control information element.

In certain embodiments, the information indicating which of the plurality of start subcarriers within the NPRACH resource are reserved for performing the contention-free random access procedure may comprise a number of reserved start subcarriers.

According to another example embodiment, a network node is disclosed. The network node comprises processing circuitry. The processing circuitry is configured to reserve, within a Narrowband Physical Random Access Channel (NPRACH) resource comprising a plurality of start subcarriers, a subset of the plurality of start subcarriers for performing a contention-free random access procedure. The processing circuitry is configured to communicate, to one or more user equipment (UEs), information indicating which of the plurality of start subcarriers within the NPRACH resource are reserved for performing the contention-free random access procedure.

According to another example embodiment, a method in a user equipment (UE) is disclosed. The method comprises receiving, from a network node, information indicating which of a plurality of start subcarriers within a Narrowband Physical Random Access Channel (NPRACH) resource are reserved for performing a contention-free random access procedure. The method comprises performing a random access procedure based on the received information.

In certain embodiments, the start subcarriers that are reserved for performing the contention-free random access procedure may comprise a subset of the plurality of start subcarriers within the NPRACH resource, and one or more start subcarriers that are not in the reserved subset may be available for performing a contention-based random access procedure. The information indicating which of the plurality of start subcarriers within the NPRACH resource are reserved for performing the contention-free random access procedure may comprise a number of the one or more start subcarriers that are not in the reserved subset. In certain embodiments, the method may comprise determining which of the plurality of start subcarriers are reserved for performing the contention-free random access procedure based on the number of the one or more start subcarriers that are not in the reserved subset. In certain embodiments, the method may comprise selecting a first start subcarrier from among the one or more start subcarriers that are not in the reserved subset, and performing the random access procedure based on the received information may comprise performing a contention-based random access procedure using the selected first start subcarrier.

In certain embodiments, the method may comprise receiving, from the network node, an instruction to use a particular one of the reserved start subcarriers for performing a contention-free random access procedure, and performing the random access procedure based on the received information may comprise performing the contention-free random access procedure using the particular one of the reserved start subcarriers.

In certain embodiments, the information indicating which of the plurality of start subcarriers within the NPRACH resource are reserved for performing the contention-free random access procedure may comprise a number of reserved start subcarriers.

In certain embodiments, the information may be received in a radio resource control information element. In certain embodiments, each of the plurality of start subcarriers within the NPRACH resource may be a first subcarrier for a subcarrier hopping sequence.

Also disclosed is a user equipment (UE). The UE comprises processing circuitry. The processing circuitry is configured to receive, from a network node, information indicating which of a plurality of start subcarriers within a Narrowband Physical Random Access Channel (NPRACH) resource are reserved for performing a contention-free random access procedure. The processing circuitry is configured to perform a random access procedure based on the received information.

Certain embodiments of the present disclosure may provide one or more technical advantages. As one example, certain embodiments may advantageously reduce signaling overhead and resource inefficiencies. As another example, certain embodiments may advantageously avoid over-provisioning and under-provisioning of random access resources for new and old UEs, respectively. As still another example, certain embodiments may advantageously avoid the need to specify new RA-RNTI relations and/or a new random access response format. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
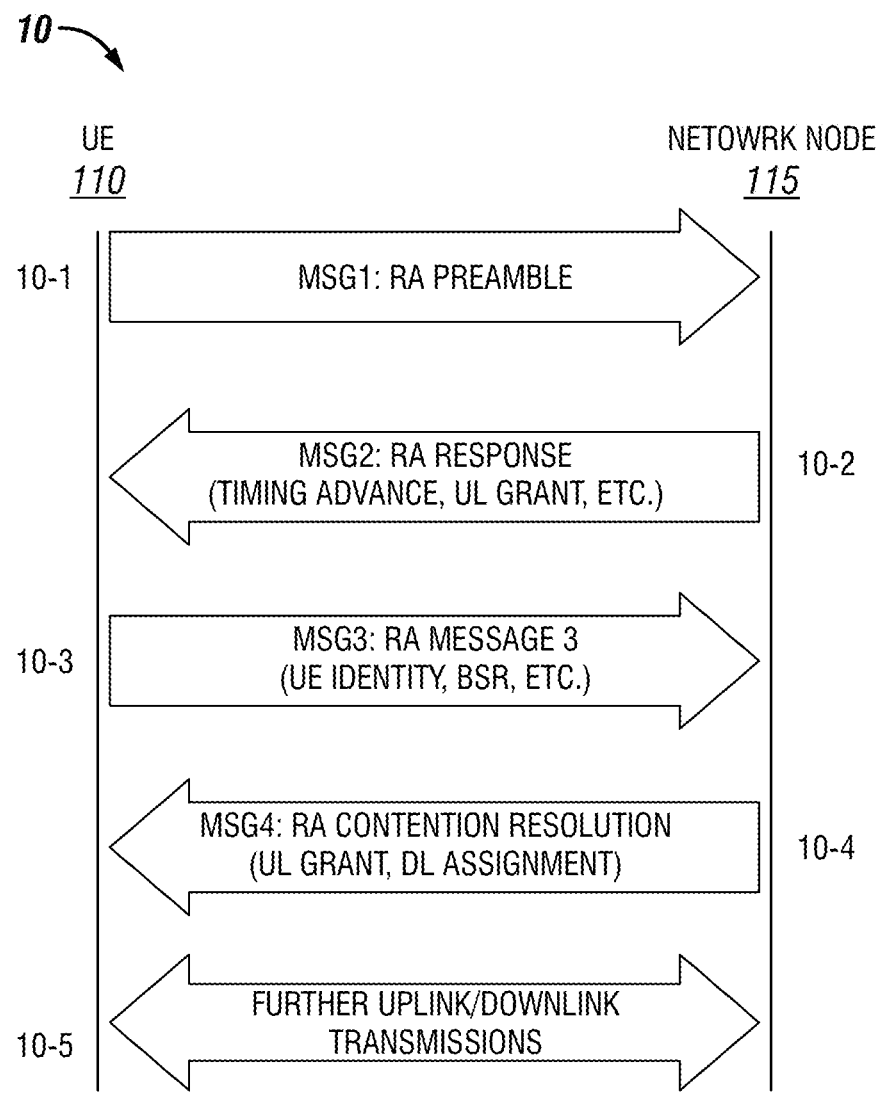
FIG. 1 is a signal flow diagram of an example random access procedure.

Release-13 NB-IoT supports contention-based random access (i.e., requiring steps for contention resolution). To improve efficiency, contention-free random access can be introduced in the future. In contention-free random access, a preamble hopping sequence can be assigned to a UE in a dedicated fashion. In some cases, a dedicated preamble/subcarrier/preamble subcarrier hopping sequence enables the steps of contention resolution to be omitted and/or avoided since the network node (e.g., eNB) knows to which UE the preamble/subcarrier/preamble subcarrier hopping sequence has been assigned and can assume that an access attempt with this preamble/subcarrier/preamble subcarrier is made by that UE. In some cases of contention-free random access (in the NB-IoT context), such as with Release-13 UEs, the one or more aspects of the contention resolution procedure may still occur even though the UE uses a dedicated preamble/subcarrier/preamble subcarrier hopping sequence.

Since a Release-13 UE randomly selects one of the preambles/subcarriers/preamble subcarrier hopping sequences of a configured NPRACH, the preambles/subcarriers/preamble subcarrier hopping sequences of an NPRACH configured with Release-13 signaling cannot be used for contention-free access. This is because if a preamble/subcarrier/preamble subcarrier hopping sequence of a Release-13 NPRACH was assigned to a UE as a dedicated resource, the network can no longer assume that an access attempt detected with that preamble/subcarrier/preamble subcarrier hopping sequence is made by the UE that was assigned that resource. Rather, the detected access attempt may have been made by a Release-13 UE that randomly selected the same resource.

New separate NPRACH resources would therefore need to be defined/configured for the purpose of dedicated assignment and contention-free random access. As a consequence, signaling overhead (e.g., for providing the additional configuration) will increase. As described above, NPRACH resources are provided in sets (i.e., chunks) of 12 subcarriers. Since contention-free random access is more efficient than contention-based random access, fewer than 12 preambles/subcarriers/preamble subcarrier hopping sequences may be needed. Also, because new resources will need to be configured/indicated with new signaling that will not be comprehended by a Release-13 UE, preambles/subcarriers/preamble subcarrier hopping sequences that are not needed for contention-free random access cannot be made available for contention-based random access for Release-13 UEs. For example, if only 5 out of 12 resources are needed for contention-free random access, the remaining 7 resources cannot be made available to Release-13 UEs for contention based random access since, in Release-13, resources can only be made available in chunks of 12 resources and Release-13 UEs cannot comprehend new signaling (i.e., signaling introduced after the implementation of the UE). Thus, resource usage will be inefficient due to over-provisioning for new UEs and/or under-provisioning for old UEs, and trunking loss. In addition, the introduction of a new/ separate NPRACH may not be compatible with Rel-13 RA-RNTI definition and/or random access response format.

The present disclosure contemplates various embodiments that may address these and other deficiencies associated with existing approaches. For example, in certain embodiments, support for contention-free preamble/subcarrier/preamble subcarrier hopping sequence is provided by adding signaling of information indicating how many subcarriers are reserved for contention-free random access and rules for where these reserved subcarriers reside inside an NPRACH resource. According to one example embodiment, a method in a network node is disclosed. The network node reserves, within a NPRACH resource comprising a plurality of start subcarriers, a subset of the plurality of start subcarriers for performing a contention-free random access procedure. The network node communicates, to one or more UEs, information indicating which of the plurality of start subcarriers within the NPRACH resource are reserved for performing the contention-free random access procedure.

In certain embodiments, the information indicating which of the plurality of start subcarriers within the NPRACH resource are reserved for performing the contention-free random access procedure comprises a number of start subcarriers within the NPRACH resource that are not reserved for performing the contention-free random access procedure. The start subcarriers within the NPRACH resource that are not reserved for performing the contention-free random access procedure may be available for performing a contention-based random access procedure. In certain embodiments, the information indicating which of the plurality of start subcarriers within the NPRACH resource are reserved for performing the contention-free random access procedure may comprise a number of reserved start subcarriers.

According to another example embodiment, a method in a UE is disclosed. The UE receives, from a network node, information indicating which of a plurality of start subcarriers within a NPRACH resource are reserved for performing a contention-free random access procedure. The UE performs a random access procedure based on the received information. In certain embodiments, the start subcarriers that are reserved for performing the contention-free random access procedure may be a subset of the plurality of start subcarriers within the NPRACH resource, and one or more start subcarriers that are not in the reserved subset may be available for performing a contention-based random access procedure. In certain embodiments, the information indicating which of the plurality of start subcarriers within the NPRACH resource are reserved for performing the contention-free random access procedure may comprise a number of the one or more start subcarriers that are not in the reserved subset. In certain embodiments, the information indicating which of the plurality of start subcarriers within the NPRACH resource are reserved for performing the contention-free random access procedure may comprise a number of reserved start subcarriers.

Certain embodiments of the present disclosure may provide one or more technical advantages. As one example, certain embodiments may advantageously reduce signaling overhead and resource inefficiencies. As another example, certain embodiments may advantageously avoid over-provisioning and under-provisioning of random access resources for new and old UEs, respectively. As still another example, certain embodiments may advantageously avoid the need to specify new RA-RNTI relations and/or a new random access response format. Other advantages may be readily apparent to one having skill in the art. Certain embodiments may have none, some, or all of the recited advantages.

Figure 2:
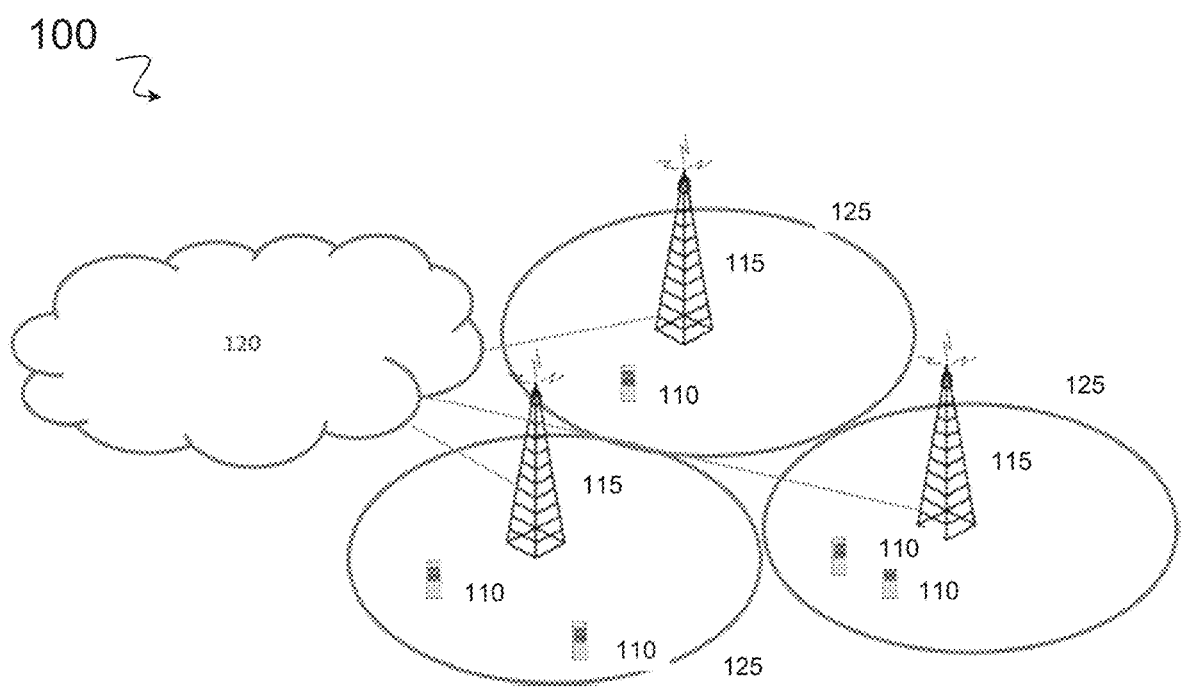
FIG. 2 illustrates an example embodiment of a wireless communications network, in accordance with certain embodiments.

FIG. 2 is a block diagram illustrating an embodiment of a network 100, in accordance with certain embodiments. Network 100 includes one or more UE(s) 110 (which may be interchangeably referred to as wireless device(s) 110 or terminal(s) 110) and one or more network node(s) 115 (which may be interchangeably referred to as eNBs 115 or base stations 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more UEs 110, and one or more different types of network nodes capable of communicating (directly or indirectly) with UEs 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication (MTC) UE or UE capable of machine to machine communication (M2M), low-cost and/or low-complexity UE, sensor or actuator equipped with UE, tablet, mobile terminal, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "network node" is used. It can be any kind of network node, which may comprise a base station (BS), radio base station, Node B, eNB, gNB, multi-standard radio (MSR) radio node such as MSR BS, network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 10-14.

Although FIG. 2 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a NB-IoT network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to NB-IoT, New Radio (NR), Long Term Evolution (LTE), LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

As described above, since a Release-13 UE randomly chooses one of the preambles/subcarriers/preamble subcarrier hopping sequences of a configured NPRACH, the preambles/subcarriers/preamble subcarrier hopping sequences of an NPRACH configured with Release-13 signaling cannot be used for contention-free random access. This is because if a preamble/subcarrier/preamble subcarrier hopping sequence of a Release-13 NPRACH were assigned to a UE as a dedicated resource, the network cannot assume that an access attempt detected with that preamble/subcarrier/preamble subcarrier hopping sequence is made by the UE that was assigned that resource. Rather, it is possible that the detected access attempt may have been made by a Release-13 UE that randomly selected the same resource. These problems can be avoided by enabling reservation of some subcarriers in the current/early release (e.g., Release-13) such that these resources are not used for contention-based random access by UEs of the current/early release (e.g., Release-13).

In the descriptions of FIGS. 3-7 below, the prefixes "nprach-" and postfix "-r13" from the existing IE description in section 2.1 and R2-164573 have been removed to simplify the figures.

Figure 3:
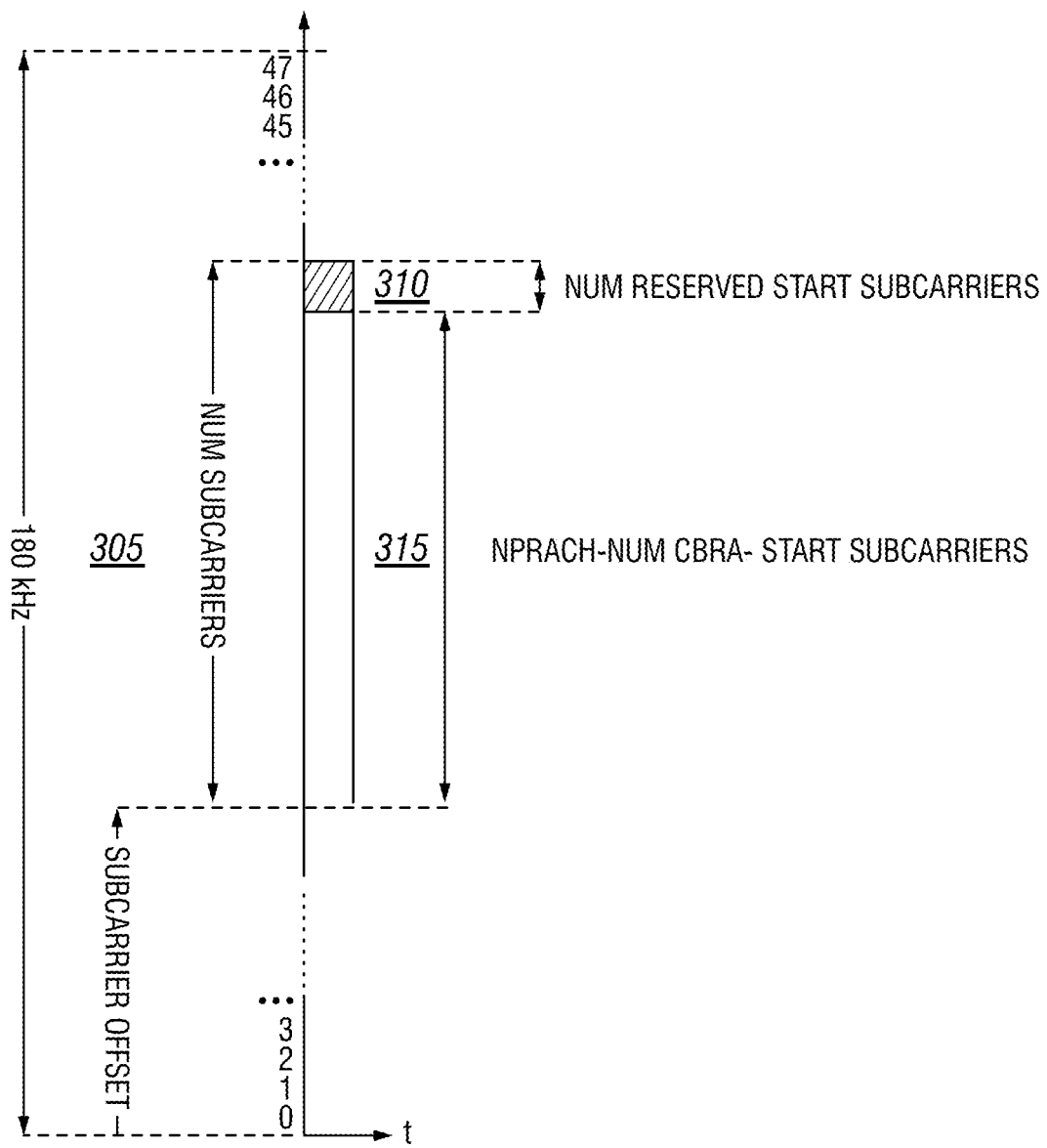
FIG. 3 illustrates a first example of how the NPRACH resources can be reserved, in accordance with certain embodiments.

FIG. 3 illustrates a first example of how the NPRACH resources can be reserved, in accordance with certain embodiments. More particularly, FIG. 3 illustrates an example of how the NPRACH resources can be reserved in a scenario in which no single/multi-tone Msg3 partitions are used. In FIG. 3, the 48 different subcarriers (indexes 0-47) are shown on the y-axis. The subcarrier spacing is 3.75 kHz (i.e., the total bandwidth is 48*3.75=180 kHz for a NB-IoT cell). These subcarriers may be interchangeably referred to herein as start subcarriers.

In the example of FIG. 3, NPRACH resource 305 is indicated by a rectangle covering a set of subcarriers. As noted above, no single/multi-tone Msg3 partitions are used, so in this example NPRACH resource 305 is a single partition (in contrast to the examples of FIGS. 5 and 7, described in more detail below). NPRACH resource 305 is divided into a reserved set of subcarriers 310 and a set of subcarriers 315 that are not reserved. Reserved set of subcarriers 310 have been reserved (for example, by a network node such as network node 115 described above in relation to FIG. 2) for performing a contention-free random access procedure. Reserved set of subcarriers 310 is graphically represented inside the rectangle of NPRACH resource 305 by an upward diagonal pattern. The subcarriers in the set of subcarriers 315 that are not reserved for a contention-free random access procedure are available for performing a contention-based random access procedure (e.g., by a Release-13 UE).

In certain embodiments, the network node may communicate information indicating which of the plurality of start subcarriers within NPRACH resource 305 are reserved for performing the contention-free random access procedure. The information indicating which of the plurality of start subcarriers within NPRACH resource 305 are reserved for performing the contention-free random access procedure may be communicated in any suitable manner. For example, in certain embodiments the information may be signaled as part of a radio resource control (RRC) IE. The information indicating which of the plurality of start subcarriers within NPRACH resource 305 are reserved for performing the contention-free random access procedure may be any suitable information.

In the example embodiment of FIG. 3, the information indicating which of the plurality of start subcarriers within NPRACH resource 305 are reserved for performing the contention-free random access procedure may comprise a number of start subcarriers within NPRACH resource 305 that are not reserved for performing the contention-free random access procedure. In other words, the communicated information may be a number of start subcarriers in the subset of start subcarriers 315 that are not reserved for a contention-free random access procedure. In such a scenario, a UE (such as UE 110 described above in relation to FIG. 2) may be aware of the start subcarriers included in NPRACH resource 305. When such a UE receives the information regarding the subset of start subcarriers 315 that are not reserved for the contention-free random access procedure, the UE is able to determine which of the plurality of start subcarriers within NPRACH resource 305 are reserved for performing the contention-free random access procedure (e.g., subset of start subcarriers 310).

As described above, the information may be communicated as a RRC IE. In a scenario in which the information communicated to the UE is a number of the one or more start subcarriers 315 that are not in the reserved subset, the IE may be, for example, an nprach-NumCBRA-StartSubcarriers IE. The nprach-NumCBRA-StartSubcarriers IE may indicate the number of start subcarriers from which a UE can randomly select a start subcarrier for a contention-based random access procedure. In some cases, the start subcarrier indices in this subset that the UE is allowed to randomly select from may be given by nprach-SubcarrierOffset+[0, nprach-NumCBRA-StartSubcarriers−1].

The UE that receives the information indicating which of the plurality of start subcarriers within NPRACH resource 305 are reserved for performing a contention-free random access procedure may perform a random access procedure based on the received information. The type of random access procedure performed by the UE may depend on the capabilities of the UE. For example, if the UE is capable of performing a contention-free random access procedure, the UE may be assigned a start subcarrier from the reserved set of start subcarriers 310 that the UE should use for the contention-free random access procedure. In some cases, the UE may receive, from the network node, an instruction to use a particular one of the reserved start subcarriers for performing the contention-free random access procedure. If the UE is not capable of performing a contention-free random access procedure, the UE may select (e.g., randomly or based on one or more criteria) a first start subcarrier from among the one or more start subcarriers 315 that are not reserved for a contention-free random access procedure. In such a scenario, the UE may perform a contention-based random access procedure using the selected first start subcarrier.

Thus, in this example the number of non-reserved start subcarriers that may be used for contention-based random access is signalled to the UE. This information indicates to the UE that the remaining start subcarriers which may not be used for contention-based random access are reserved for contention-free random access. An alternative approach in which the number of reserved start subcarriers is signalled (i.e., instead of signalling the number of non-reserved start subcarriers the number of reserved start subcarriers is signalled) is described below in relation to FIGS. 4 and 5.

Figure 4:
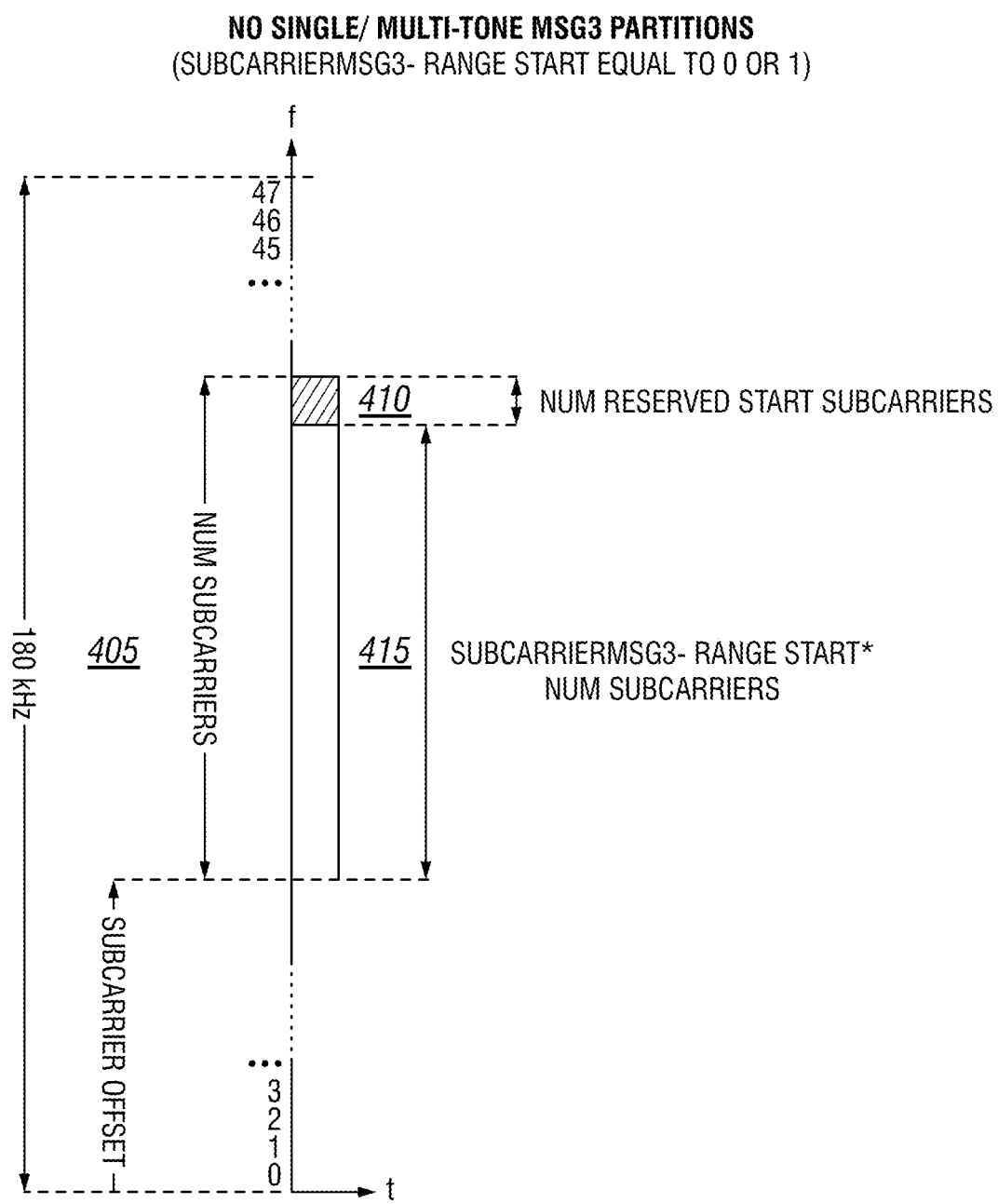
FIG. 4 illustrates a second example of how the NPRACH resources can be reserved, in accordance with certain embodiments.

FIG. 4 illustrates a second example of how the NPRACH resources can be reserved, in accordance with certain embodiments. More particularly, FIG. 4 illustrates how the NPRACH resources can be reserved in a scenario in which no single/multi-tone Msg3 partitions are used. Similar to FIG. 3 described above, the 48 different subcarriers (index is 0-47) are shown on the y-axis. The subcarrier spacing is 3.75 kHz (i.e., the total bandwidth is 48*3.75=180 kHz for a NB-IoT cell).

In the example of FIG. 4, NPRACH resource 405 is indicated by a rectangle covering a set of subcarriers. As noted above, no single/multi-tone Msg3 partitions are used, so in this example NPRACH resource 405 is a single partition (in contrast to the examples of FIGS. 5 and 7, described in more detail below). NPRACH resource 405 is divided into a reserved set of subcarriers 410 and a set of subcarriers 415 that are not reserved. Reserved set of subcarriers 410 have been reserved (for example, by a network node such as network node 115 described above in relation to FIG. 2) for performing a contention-free random access procedure. Reserved set of subcarriers 410 is graphically represented inside the rectangle of NPRACH resource 405 by an upward diagonal pattern. The subcarriers in the set of subcarriers 415 that are not reserved for a contention-free random access procedure are available for performing a contention-based random access procedure (e.g., by a Release-13 UE).

As described above, the network node (such as network node 115 described above in relation to FIG. 2) may communicate information indicating which of the plurality of start subcarriers within NPRACH resource 405 are reserved for performing the contention-free random access procedure. The information indicating which of the plurality of start subcarriers within NPRACH resource 405 are reserved for performing the contention-free random access procedure may be communicated in any suitable manner. For example, in certain embodiments the information may be signaled as part of a RRC IE. The information indicating which of the plurality of start subcarriers within NPRACH resource 405 are reserved for performing the contention-free random access procedure may be any suitable information.

In the example of FIG. 4, the information indicating which of the plurality of start subcarriers within NPRACH resource 405 are reserved for performing the contention-free random access procedure may comprise a number of reserved start subcarriers 410. In such a scenario, a new IE called NumReservedStartSubcarrier is added to indicate the number of start subcarriers that are reserved for contention-free random access. In certain embodiments, the number of start subcarriers is taken from the upper edge of NPRACH resource 405 (i.e., starting from the last index within the interval [0, NumSubcarriers−1]). A detailed proposal of the additional RRC IE is illustrated below compared to section 2.1 and R2-164573 included in the NPRACH-Parameters-NB-r13. The new added IE is called nprach-NumReservedStartSubcarriers-r13 and is put in italic and underlined to highlight the change compared to section 2.1 and R2-164573. The field description for this new parameter is also provided, including the rule for how to determine the subcarriers that are reserved (similar to what is shown in FIG. 4).

```
NPRACH-Parameters-NB-r13 ::=        SEQUENCE {
    nprach-Periodicity-r13              ENUMERATED {ms40, ms80, ms160, ms240,
                                                    ms320, ms640, ms1280, ms2560},
    nprach-StartTime-r13                ENUMERATED {ms8, ms16, ms32, ms64,
                                                    ms128, ms256, ms512, ms1024},
    nprach-SubcarrierOffset-r13         ENUMERATED {n0, n12, n24, n36, n2, n18, n34,
spare1},
    nprach-NumSubcarriers-r13           ENUMERATED {n12, n24, n36, n48},
    nprach-SubcarrierMSG3-RangeStart-r13 ENUMERATED {zero, oneThird, twoThird, one},
```

| | |
|---|---|
| nprach-NumReservedStartSubcarriers-r13 | ENUMERATED {n0, n1, n2, n3, n4, n6, n8, n12}, |
| maxNumPreambleAttemptCE-r13 | ENUMERATED {n3, n4, n5, n6, n7, n8, n10, spare1}, |
| numRepetitionsPerPreambleAttempt-r13 | ENUMERATED {n1, n2, n4, n8, n16, n32, n64, n128}, |
| npdcch-NumRepetitions-RA-r13 | ENUMERATED {r1, r2, r4, r8, r16, r32, r64, r128, r256, r512, r1024, r2048, spare4, spare3, spare2, spare1}, |
| npdcch-StartSF-CSS-RA-r13 | ENUMERATED {v1dot5, v2, v4, v8, v16, v32, v48, v64}, |
| npdcch-Offset-RA-r13 | ENUMERATED {zero, oneEighth, oneFourth, threeEighth} |
| } | |

NPRACH-ConfigSIB-NB field descriptions

...
nprach-NumReservedStartSubcarriers:
The number of start subcarriers reserved for contention free random access. The UE shall not select one of these reserved start subcarriers when randomly selecting a start subcarrier in the preamble selection in 36.321.
The start subcarrier indexes that the UE is allowed to randomly select from are according to the following:
If nprach-SubcarrierMSG3-RangeStart is equal to {zero} or {one}:
nprach-SubcarrierOffset +[0, nprach-NumSubcarriers − nprach-NumReservedStartSubcarriers − 1];
else if nprach-SubcarrierMSG3-RangeStart is equal to {oneThird} or {twoThird}:
(nprach-SubcarrierOffset +[0, nprach-NumSubcarriers* nprach-SubcarrierMSG3-RangeStart − CEILING(nprach-NumReservedStartSubcarriers/2) − 1] for the single-tone Msg3 NPRACH partition;
nprach-SubcarrierOffset +[nprach-NumSubcarriers* nprach-SubcarrierMSG3-RangeStart, nprach-NumSubcarriers − FLOOR(nprach-NumReservedStartSubcarriers/2) − 1] for the multi-tone Msg3 NPRACH partition;
...

The UE that receives the information indicating which of the plurality of start subcarriers within NPRACH resource 405 are reserved for performing a contention-free random access procedure may perform a random access procedure based on the received information. For example, if the UE is capable of performing a contention-free random access procedure, the UE may be assigned a start subcarrier from the reserved set of start subcarriers 410 that the UE should use for the contention-free random access procedure. In some cases, the UE may receive, from the network node, an instruction to use a particular one of the reserved start subcarriers for performing the contention-free random access procedure. The UE may then perform the contention-free random access procedure. In some cases (e.g., with Release-14 UEs), the contention-free random access procedure may no longer require the contention-resolution procedure described above in relation to FIG. 1. In some cases (e.g., with Release-13 UEs), one or more steps of the contention-resolution procedure may still be performed, despite the random access procedure being essentially contention-free.

If the UE is not capable of performing a contention-free random access procedure, the UE may select (e.g., randomly or based on one or more criteria) a first start subcarrier from among the one or more start subcarriers 415 that are not reserved for a contention-free random access procedure. In such a scenario, the UE may perform a contention-based random access procedure using the selected first start subcarrier.

Figure 5:
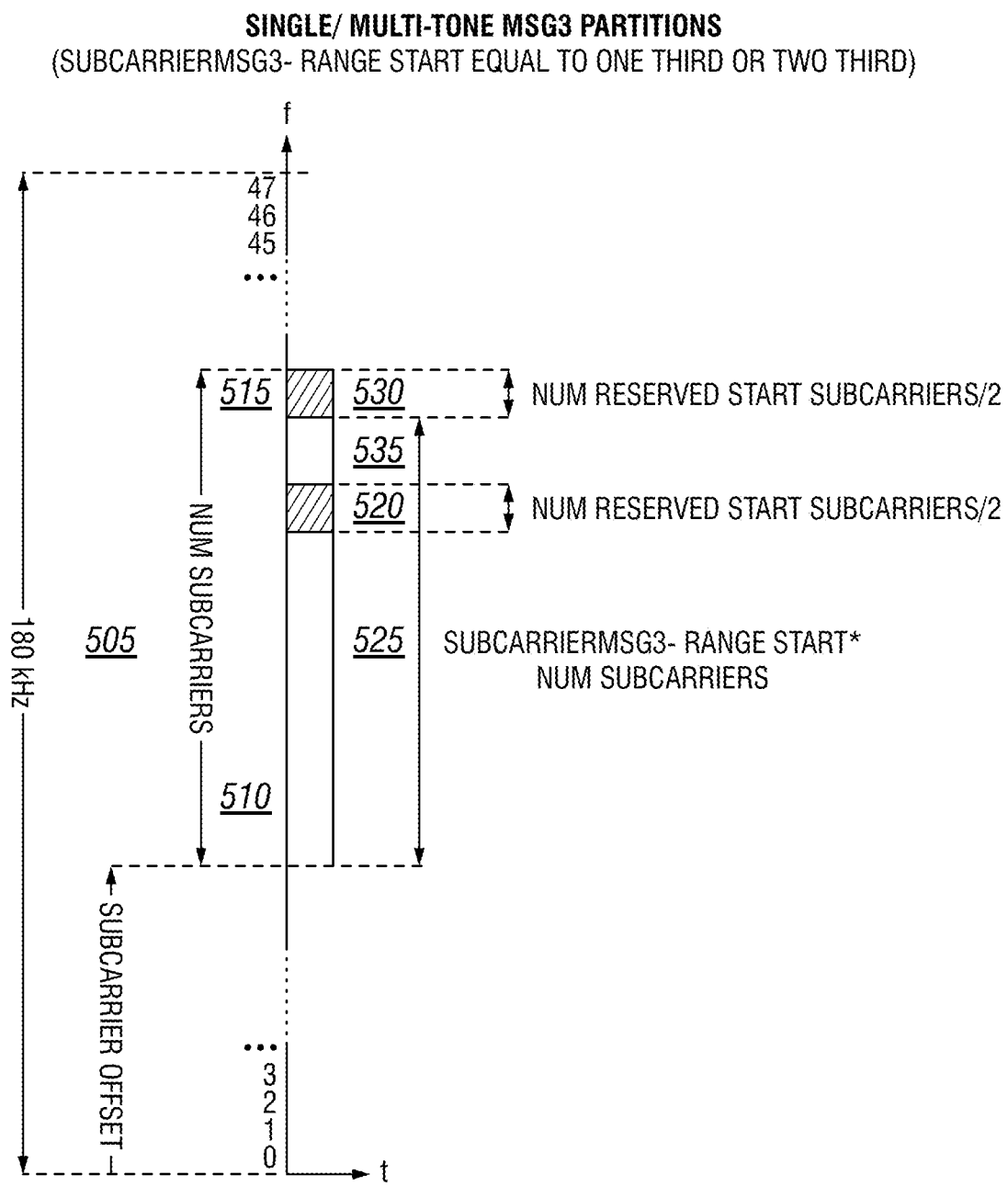
FIG. 5 illustrates a third example of how the NPRACH resources can be reserved, in accordance with certain embodiments.

FIG. 5 illustrates a third example of how the NPRACH resources can be reserved, in accordance with certain embodiments. More particularly, FIG. 5 illustrates an example of how NPRACH resources 505 can be reserved in a scenario in which single/multi-tone Msg3 partitions are used. In such a scenario, NPRACH resource 505 is partitioned into two sets, a first set 510 for single-tone and a second set 515 for multi-tone Msg3 transmission. Within each partition 510 and 515, a subset of the start subcarriers are reserved for performing a contention-free random access procedure. As shown in FIG. 5, first set 510 includes a subset of start subcarriers 520 that are reserved for a contention-free random access procedure and a subset of start subcarriers 525 that are not reserved for a contention-free random access procedure and are therefore available for performing a contention-based random access procedure. Similarly, second set 515 includes a subset of start subcarriers 530 that are reserved for a contention-free random access procedure and a subset of start subcarriers 535 that are not reserved for a contention-free random access procedure and are therefore available for performing a contention-based random access procedure.

As described above, a network node (such as network node 115 described above in relation to FIG. 2) may communicate information indicating which of the plurality of start subcarriers within NPRACH resource 505 are reserved for performing the contention-free random access procedure (for example, in a RRC IE such as the NumCBRA-StartSubcarriers IE described above in relation to FIG. 3 or the NumReservedStartSubcarrier IE described above in relation to FIG. 4). Although FIG. 5 illustrates an example in which the NumReservedStartSubcarrier IE element is used, the present disclosure is not limited to such an example embodiment. Rather, the present disclosure contemplates that in certain embodiments the NumCBRA-StartSubcarriers IE, or any other suitable information element, may be used.

In a scenario such as the one illustrated in FIG. 5 in which single/multi-tone Msg3 partitions are used, one or more rules may be defined to enable a UE that receives the NumReservedStartSubcarrier IE to determine how many start subcarriers in each of partitions 510 and 515 are reserved for performing a contention-free random access procedure. In certain embodiments, the rule may use the floor( ) and ceiling( ) function for calculating the number of reserved start subcarriers per partition (in the example of FIG. 5 the mathematical operators for these functions are shown as ⌊ ⌋ and ⌈ ⌉, respectively. In certain embodiments, the following rules may apply. If the number of reserved subcarriers (e.g., as indicated by the NumReservedStartSubcarrier IE) is an even number, then each of partitions 510 and 515 get an equal amount of reserved subcarriers. If the number of reserved subcarriers is an odd number, then the first partition (e.g., partition 510) gets one more reserved subcarrier compared to the second partition (e.g., partition 515). If only one subcarrier is reserved, then the second partition (e.g., partition 515) of NPRACH resource 505 will not have any reserved subcarriers.

In certain embodiments, second partition 515 could get one more reserved subcarrier in case the floor( ) and ceiling ( ) functions change places. If any such change would be done, the IE will be the same as described herein but the field descriptions above would need to be modified.

Figure 6:
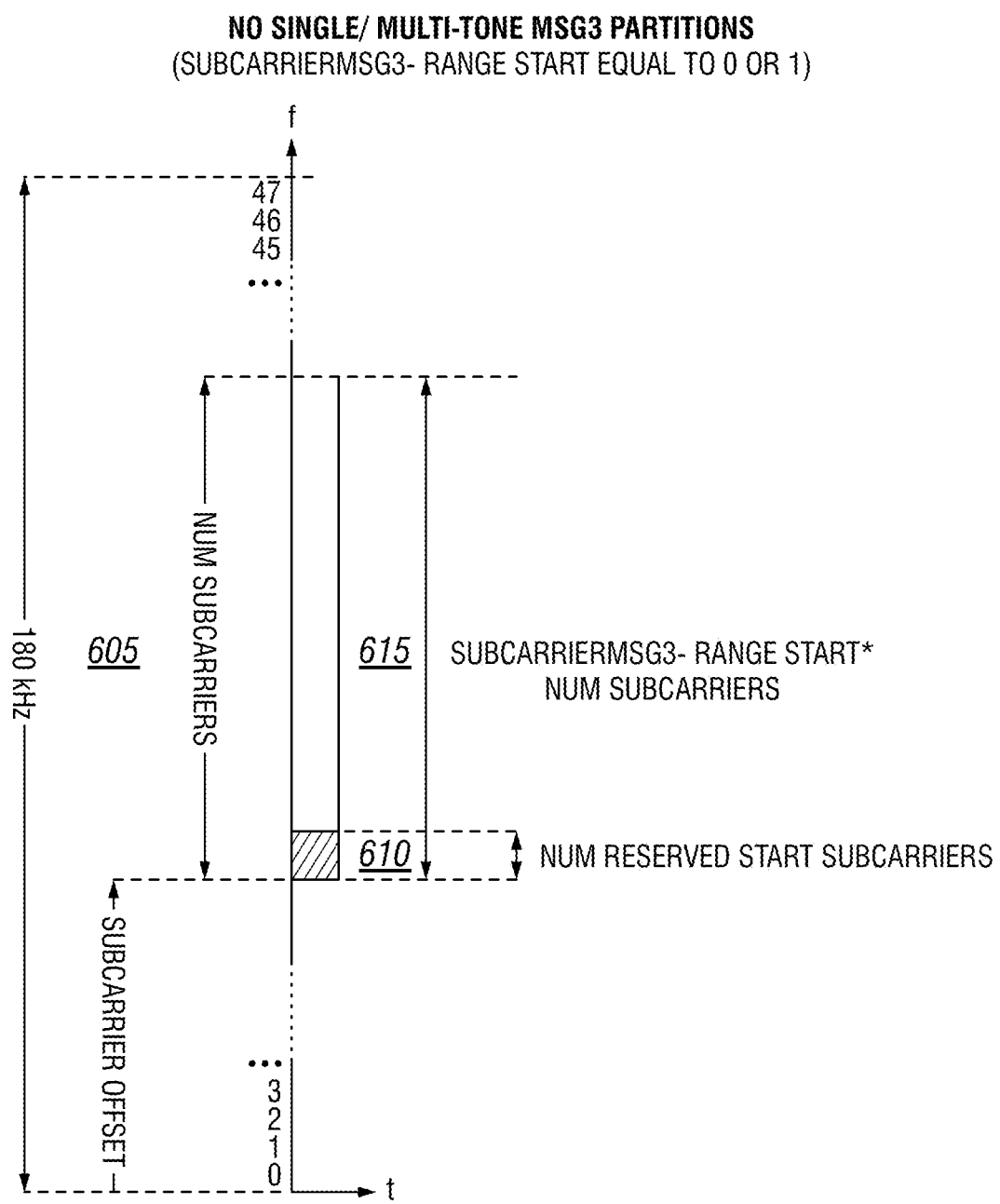
FIG. 6 illustrates a fourth example of how the NPRACH resources can be reserved, in accordance with certain embodiments.

FIG. 6 illustrates a fourth example of how the NPRACH resources can be reserved, in accordance with certain embodiments. The example embodiment of FIG. 6 is similar to the example embodiment of FIG. 4 in that NPRACH resource 605 is indicated by a rectangle covering a set of subcarriers. Like the example embodiment of FIG. 4, no single/multi-tone Msg3 partitions are used, so in this example NPRACH resource 605 is a single partition divided into a reserved set of subcarriers 610 that are reserved for a contention-free random access procedure and a set of subcarriers 615 that are not reserved and are therefore available for a contention-based random access procedure. In contrast to the example embodiment described above in relation to FIG. 4, FIG. 6 illustrates a scenario in which the reserved start subcarriers 610 are started from the lower edge of NPRACH partition 605.

Figure 7:
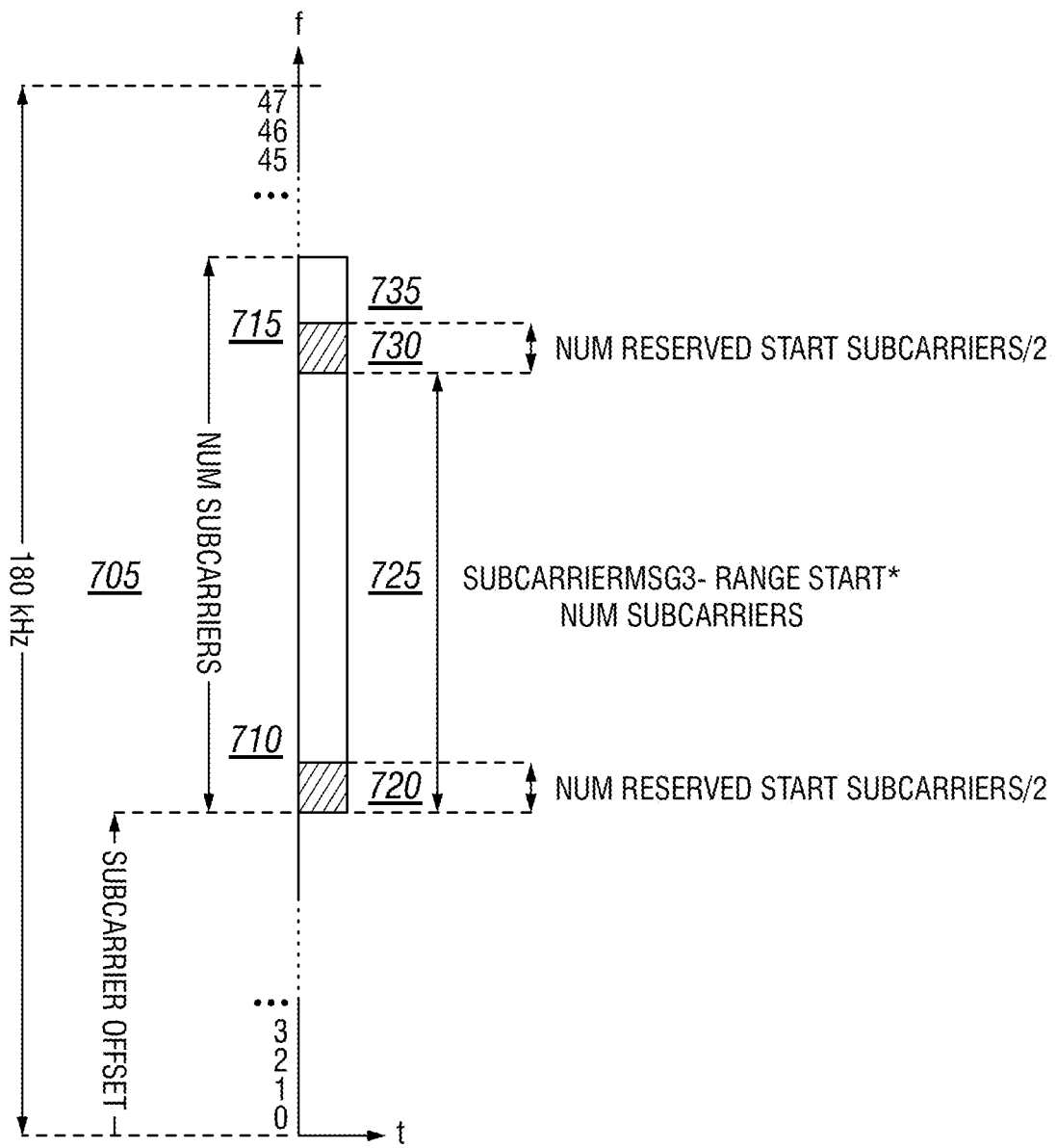
FIG. 7 illustrates a fifth example of how the NPRACH resources can be reserved, in accordance with certain embodiments.

FIG. 7 illustrates a fifth example of how the NPRACH resources can be reserved, in accordance with certain embodiments. The example embodiment of FIG. 7 is similar to the example embodiment of FIG. 5 in that FIG. 7 illustrates how NPRACH resources 705 can be reserved in a scenario in which single/multi-tone Msg3 partitions are used. In such a scenario, NPRACH resource 705 is partitioned into two sets, a first set 710 for single-tone and a second set 715 for multi-tone Msg3 transmission. Within each partition, a subset of the start subcarriers are reserved for performing a contention-free random access procedure. As shown in FIG. 7, first set 710 includes a subset of start subcarriers 720 that are reserved for a contention-free random access procedure and a subset of start subcarriers 725 that are not reserved for a contention-free random access procedure and are therefore available for performing a contention-based random access procedure. Similarly, second set 715 includes a subset of start subcarriers 730 that are reserved for a contention-free random access procedure and a subset of start subcarriers 735 that are not reserved for a contention-free random access procedure and are therefore available for performing a contention-based random access procedure.

In contrast to the example embodiment described above in relation to FIG. 5, FIG. 7 illustrates a scenario in which the reserved start subcarriers 720 and 730 are started from the lower edge of NPRACH partitions 710 and 715, respectively. A UE may determine how many start subcarriers in each of partitions 710 and 715 are reserved for performing a contention-free random access procedure in the manner described above in connection with FIG. 5. In certain embodiments, the second partition could get one more reserved subcarrier in case the floor( ) and ceiling( ) functions change places. If any such change would be done, the IE will be the same but the field description would need to be updated slightly compared to the above.

Although the above embodiments describe the use of the reserved start subcarriers for contention-free random access scenarios, there should not be any limitation in the system for the network node (e.g., eNB) to provide the same reserved start subcarrier to multiple UEs at the same time in order to obtain "reduced contention probability" for other use cases. The present disclosure contemplates that the various embodiments described herein may be applicable to a variety of use cases.

Figure 8:
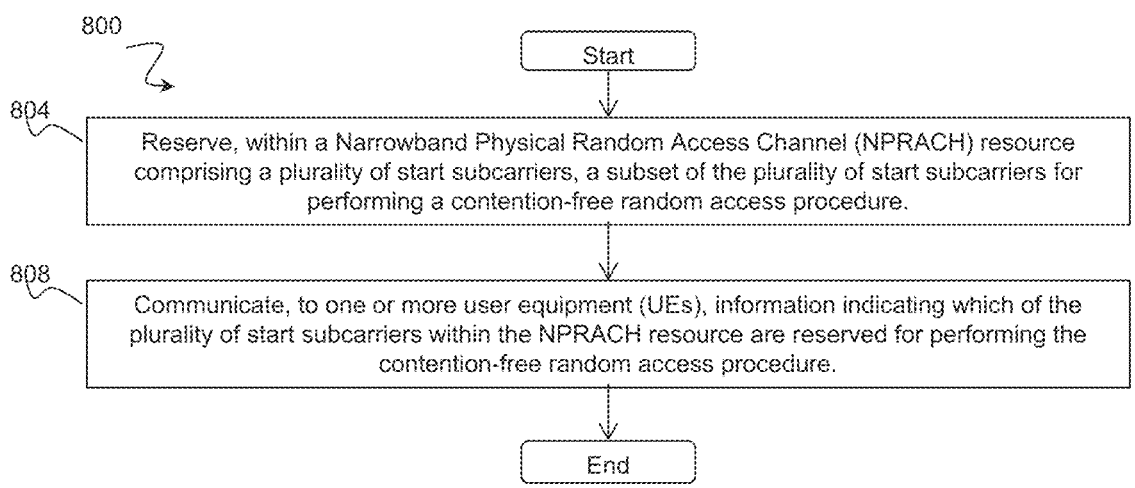
FIG. 8 is a flow diagram of a method in a network node, in accordance with certain embodiments.

FIG. 8 is a flow diagram of a method 800 in a network node, in accordance with certain embodiments. Method 800 begins at step 804, where the network node reserves, within a NPRACH resource comprising a plurality of start subcarriers, a subset of the plurality of start subcarriers for performing a contention-free random access procedure. In certain embodiments, each of the plurality of start subcarriers within the NPRACH resource may be a first subcarrier for a subcarrier hopping sequence.

At step 808, the network node communicates, to one or more UEs, information indicating which of the plurality of start subcarriers within the NPRACH resource are reserved for performing the contention-free random access procedure. In certain embodiments, the information may be signaled as part of a radio resource control information element.

In certain embodiments, the information indicating which of the plurality of start subcarriers within the NPRACH resource are reserved for performing the contention-free random access procedure may comprise a number of start subcarriers within the NPRACH resource that are not reserved for performing the contention-free random access procedure. The start subcarriers within the NPRACH resource that are not reserved for performing the contention-free random access procedure may be available for performing a contention-based random access procedure.

In certain embodiments, the information indicating which of the plurality of start subcarriers within the NPRACH resource are reserved for performing the contention-free random access procedure may comprise a number of reserved start subcarriers. In certain embodiments, the method may comprise communicating, to a first UE, an instruction to use a particular one of the reserved start subcarriers for performing the contention-free random access procedure.

Figure 9:
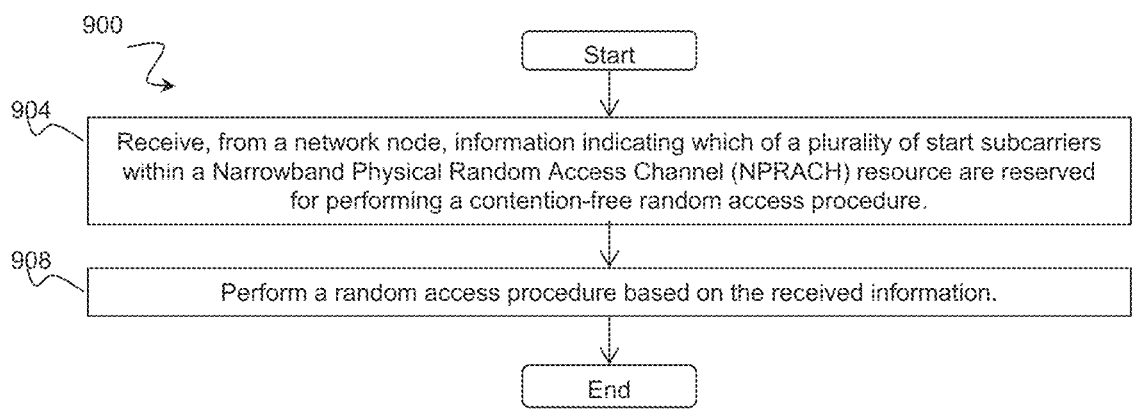
FIG. 9 is a flow diagram of a method in a UE, in accordance with certain embodiments.

FIG. 9 is a flow diagram of a method 900 in a UE, in accordance with certain embodiments. Method 900 begins at step 904, where the UE receives, from a network node, information indicating which of a plurality of start subcarriers within a NPRACH resource are reserved for performing a contention-free random access procedure. In certain embodiments, the start subcarriers that are reserved for performing the contention-free random access procedure may comprise a subset of the plurality of start subcarriers within the NPRACH resource. One or more start subcarriers that are not in the reserved subset may be available for performing a contention-based random access procedure. In certain embodiments, each of the plurality of start subcarriers within the NPRACH resource is a first subcarrier for a subcarrier hopping sequence. In certain embodiments, the information may be received in a radio resource control information element.

At step 908, the UE performs a random access procedure based on the received information.

In certain embodiments, the information indicating which of the plurality of start subcarriers within the NPRACH resource are reserved for performing the contention-free random access procedure may comprise a number of the one or more start subcarriers that are not in the reserved subset. The method may comprise determining which of the plurality of start subcarriers are reserved for performing the contention-free random access procedure based on the number of the one or more start subcarriers that are not in the reserved subset. The method may comprise selecting a first start subcarrier from among the one or more start subcarriers that are not in the reserved subset. In such a scenario, performing the random access procedure based on the received information may comprise performing a contention-based random access procedure using the selected first start subcarrier.

In certain embodiments, the information indicating which of the plurality of start subcarriers within the NPRACH resource are reserved for performing the contention-free random access procedure may comprise a number of reserved start subcarriers.

In certain embodiments, the method may comprise receiving, from the network node, an instruction to use a particular one of the reserved start subcarriers for performing a contention-free random access procedure. In such a scenario, performing the random access procedure based on the received information may comprise performing the contention-free random access procedure using the particular one of the reserved start subcarriers.

Figure 10:
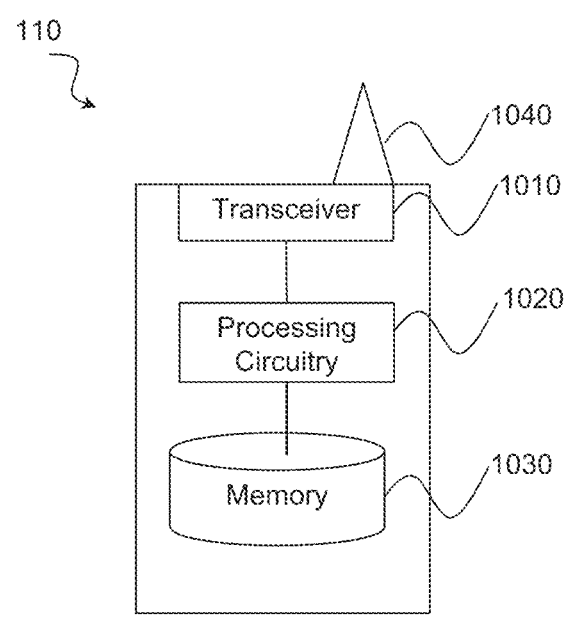
FIG. 10 is a block schematic of an exemplary wireless device, in accordance with certain embodiments.

FIG. 10 is a block schematic of an exemplary UE 110, in accordance with certain embodiments. UE 110 may refer to any type of wireless device communicating with a node and/or with another wireless device in a cellular or mobile communication system. Examples of UE 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A UE 110 may also be referred to as a wireless device, a station (STA), a device, or a terminal in some embodiments. UE 110 includes transceiver 1010, processing circuitry 1020, and memory 1030. In some embodiments, transceiver 1010 facilitates transmitting wireless signals to and receiving wireless signals from network node 115 (e.g., via antenna 1040), processing circuitry 1020 executes instructions to provide some or all of the functionality described above as being provided by UE 110, and memory 1030 stores the instructions executed by processing circuitry 1020.

Processing circuitry 1020 may include any suitable combination of hardware and software implemented in one or more modules to execute instructions and manipulate data to perform some or all of the described functions of UE 110, such as the functions of UE 110 described above in relation to FIGS. 1-9. In some embodiments, processing circuitry 1020 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1030 is generally operable to store instructions, such as a computer program, software, an application including one or more of logic, rules, algorithms, code, tables, etc. and/or other instructions capable of being executed by processing circuitry 1020. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 1020.

Other embodiments of UE 110 may include additional components beyond those shown in FIG. 10 that may be responsible for providing certain aspects of the wireless device's functionality, including any of the functionality described above and/or any additional functionality (including any functionality necessary to support the solution described above). As just one example, UE 110 may include input devices and circuits, output devices, and one or more synchronization units or circuits, which may be part of the processing circuitry 1020. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 11:
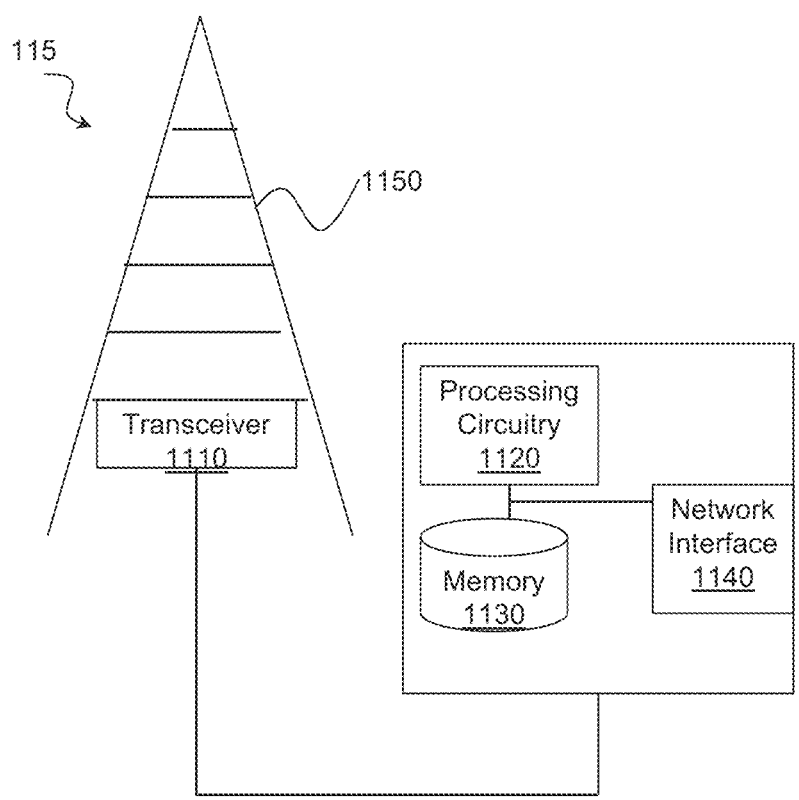
FIG. 11 is a block schematic of an exemplary network node, in accordance with certain embodiments.

FIG. 11 is a block schematic of an exemplary network node 115, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1110, processing circuitry 1120, memory 1130, and network interface 1140. In some embodiments, transceiver 1110 facilitates transmitting wireless signals to and receiving wireless signals from UE 110 (e.g., via antenna 1150), processing circuitry 1120 executes instructions to provide some or all of the functionality described above as being provided by a network node 115, memory 1130 stores the instructions executed by processing circuitry 1120, and network interface 1140 communicates signals to backend network components, such as a gateway, switch, router, Internet, Public Switched Telephone Network (PSTN), core network nodes or radio network controllers 130, etc.

Processing circuitry 1120 may include any suitable combination of hardware and software implemented in one or more modules to execute instructions and manipulate data to perform some or all of the described functions of network node 115, such as those described above in relation to FIGS. 1-9. In some embodiments, processing circuitry 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by processing circuitry 1120. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processing circuitry 1120 and may refer to any suitable device operable to receive input for network node 115, send output from network node 115, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of network node 115 may include additional components beyond those shown in FIG. 11 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 12:
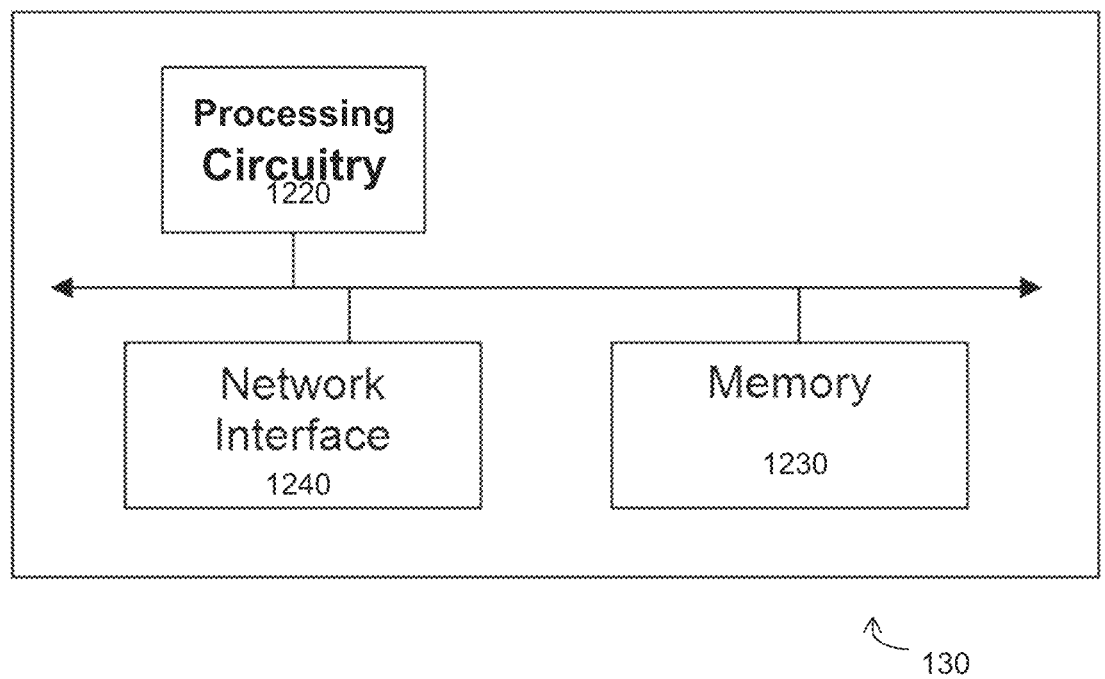
FIG. 12 is a block schematic of an exemplary radio network controller or core network node, in accordance with certain embodiments.

FIG. 12 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 1220, memory 1230, and network interface 1240. In some embodiments, processing circuitry 1220 executes instructions to provide some or all of the functionality described above as being provided by the network node, memory 1230 stores the instructions executed by processing circuitry 1220, and network interface 1240 communicates signals to any suitable node, such as a gateway, switch, router, Internet, Public Switched Telephone Network (PSTN), network nodes 115, radio network controllers or core network nodes 130, etc.

Processing circuitry 1220 may include any suitable combination of hardware and software implemented in one or more modules to execute instructions and manipulate data to perform some or all of the described functions of the radio network controller or core network node 130. In some embodiments, processing circuitry 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by processing circuitry 1220. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processing circuitry 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 12 that may be responsible for providing certain aspects of the network node's functionality, including any of the functionality described above and/or any additional functionality (including any functionality necessary to support the solution described above).

Figure 13:
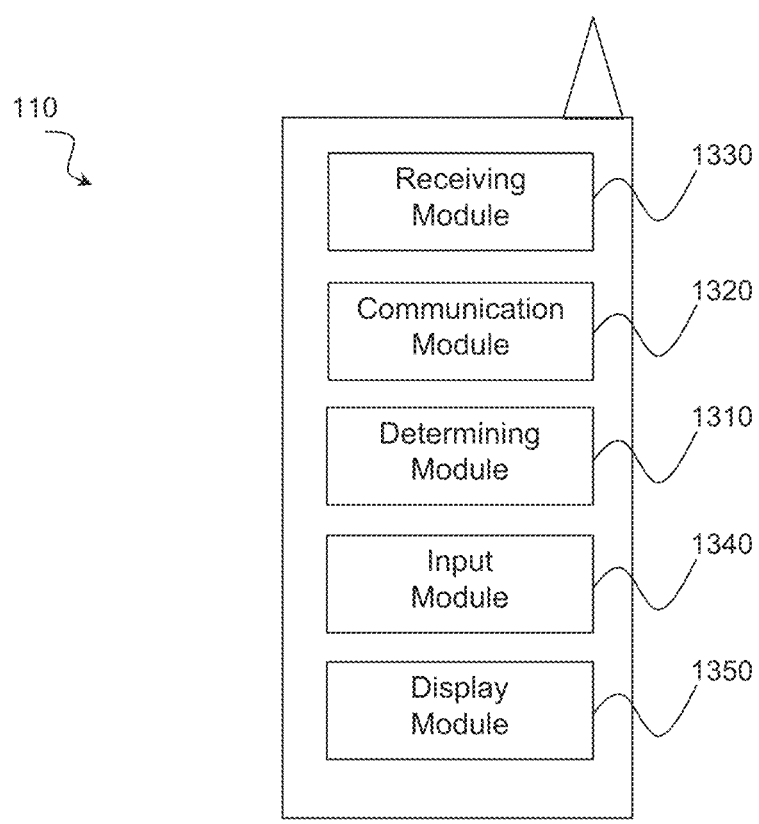
FIG. 13 is a block schematic of an exemplary wireless device, in accordance with certain embodiments.

FIG. 13 is a schematic block diagram of an exemplary wireless device, in accordance with certain embodiments. UE 110 may include one or more modules. For example, UE 110 may include a determining module 1310, a communication module 1320, a receiving module 1330, an input module 1340, a display module 1350, and any other suitable modules. In some embodiments, one or more of determining module 1310, communication module 1320, receiving module 1330, input module 1340, display module 1350, or any other suitable module may be implemented using one or more processors, such as processing circuitry 1020 described above in relation to FIG. 10. In certain embodiments, the functions of two or more of the various modules may be combined into a single module. UE 110 may perform the methods for providing contention free random access resources for NB-IoT described above in relation to FIGS. 1-9.

Determining module 1310 may perform the processing functions of UE 110. For example, determining module 1310 may perform a random access procedure based on the received information. As another example, determining module 1310 may determine which of the plurality of start subcarriers are reserved for performing the contention-free random access procedure based on the number of the one or more start subcarriers that are not in the reserved subset. As still another example, determining module 1310 may select a first start subcarrier from among the one or more start subcarriers that are not in the reserved subset. Determining module 1310 may include or be included in one or more processors, such as processing circuitry 1020 described above in relation to FIG. 10. Determining module 1310 may include analog and/or digital circuitry configured to perform any of the functions of determining module 1310 and/or processing circuitry 1020 described above. The functions of determining module 1310 described above may, in certain embodiments, be performed in one or more distinct modules.

Communication module 1320 may perform the transmission functions of UE 110. Communication module 1320 may include a transmitter and/or a transceiver, such as transceiver 1010 described above in relation to FIG. 10. Communication module 1320 may include circuitry configured to wirelessly transmit messages and/or signals. In particular embodiments, communication module 1320 may receive messages and/or signals for transmission from determining module 1310. In certain embodiments, the functions of communication module 1320 described above may be performed in one or more distinct modules.

Receiving module 1330 may perform the receiving functions of UE 110. For example, receiving module 1330 may receive, from a network node, information indicating which of a plurality of start subcarriers within a Narrowband Physical Random Access Channel (NPRACH) resource are reserved for performing a contention-free random access procedure. As another example, receiving module 1330 may receive, from the network node, an instruction to use a particular one of the reserved start subcarriers for performing a contention-free random access procedure. Receiving module 1330 may include a receiver and/or a transceiver. Receiving module 1330 may include a receiver and/or a transceiver, such as transceiver 1010 described above in relation to FIG. 10. Receiving module 1330 may include circuitry configured to wirelessly receive messages and/or signals. In particular embodiments, receiving module 1330 may communicate received messages and/or signals to determining module 1310. The functions of receiving module 1330 described above may, in certain embodiments, be performed in one or more distinct modules.

Input module 1340 may receive user input intended for UE 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1310. The functions of input module 1340 described above may, in certain embodiments, be performed in one or more distinct modules.

Display module 1350 may present signals on a display of UE 110. Display module 1350 may include the display and/or any appropriate circuitry and hardware configured to present signals on the display. Display module 1350 may receive signals to present on the display from determining module 1310. The functions of display module 1350 described above may, in certain embodiments, be performed in one or more distinct modules.

Determining module 1310, communication module 1320, receiving module 1330, input module 1340, and display module 1350 may include any suitable configuration of hardware and/or software. UE 110 may include additional modules beyond those shown in FIG. 13 that may be responsible for providing any suitable functionality, including any of the functionality described above and/or any additional functionality (including any functionality necessary to support the various solutions described herein).

Figure 14:
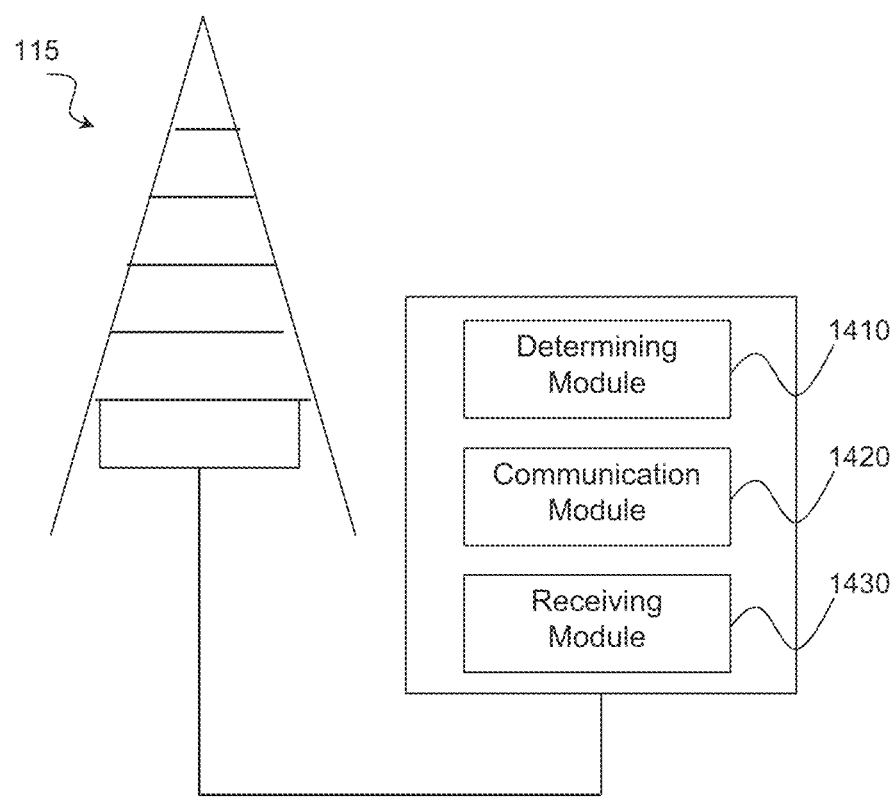
FIG. 14 is a block schematic of an exemplary network node, in accordance with certain embodiments.

FIG. 14 is a schematic block diagram of an exemplary network node 115, in accordance with certain embodiments. Network node 115 may include one or more modules. For example, network node 115 may include determining module 1410, communication module 1420, receiving module 1430, and any other suitable modules. In some embodiments, one or more of determining module 1410, communication module 1420, receiving module 1430, or any other suitable module may be implemented using one or more processors, such as processing circuitry 1120 described above in relation to FIG. 11. In certain embodiments, the functions of two or more of the various modules may be combined into a single module. Network node 115 may perform the methods for providing contention-free random access resources for NB-IoT described above in relation to FIGS. 1-9.

Determining module 1410 may perform the processing functions of network node 115. As an example, determining module 1410 may reserve, within a NPRACH resource comprising a plurality of start subcarriers, a subset of the plurality of start subcarriers for performing a contention-free random access procedure. Determining module 1410 may include or be included in one or more processors, such as processing circuitry 1120 described above in relation to FIG. 11. Determining module 1410 may include analog and/or digital circuitry configured to perform any of the functions of determining module 1410 and/or processing circuitry 1120 described above. The functions of determining module 1410 may, in certain embodiments, be performed in one or more distinct modules.

Communication module 1420 may perform the transmission functions of network node 115. As one example, communication module 1420 may communicate, to one or more UEs, information indicating which of the plurality of start subcarriers within the NPRACH resource are reserved for performing the contention-free random access procedure. As another example, communication module 1420 may communicate, to a first UE, an instruction to use a particular one of the reserved start subcarriers for performing the contention-free random access procedure. Communication module 1420 may transmit messages to one or more of wireless devices 110. Communication module 1420 may include a transmitter and/or a transceiver, such as transceiver 1110 described above in relation to FIG. 11. Communication module 1420 may include circuitry configured to wirelessly transmit messages and/or signals. In particular embodiments, communication module 1420 may receive messages and/or signals for transmission from determining module 1410 or any other module. The functions of communication module 1420 may, in certain embodiments, be performed in one or more distinct modules.

Receiving module 1430 may perform the receiving functions of network node 115. Receiving module 1430 may receive any suitable information from a wireless device. Receiving module 1430 may include a receiver and/or a transceiver, such as transceiver 1110 described above in relation to FIG. 11. Receiving module 1430 may include circuitry configured to wirelessly receive messages and/or signals. In particular embodiments, receiving module 1430 may communicate received messages and/or signals to determining module 1410 or any other suitable module. The functions of receiving module 1430 may, in certain embodiments, be performed in one or more distinct modules.

Determining module 1410, communication module 1420, and receiving module 1430 may include any suitable configuration of hardware and/or software. Network node 115 may include additional modules beyond those shown in FIG. 14 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP Third Generation Partnership Project
AP Access Point
BS Base Station
BSC Base Station Controller
BTS Base Transceiver Station
CDM Code Division Multiplexing
CPE Customer Premises Equipment
D2D Device-to-device
DAS Distributed Antenna System
DL Downlink
eNB eNode B
FDD Frequency Division Duplex
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MCS Modulation level and coding scheme
MSR Multi-standard Radio
NAS Non-Access Stratum
NB-IoT Narrow Band Internet-of-Things
NPDCCH Narrowband Physical Downlink Control Channel
NPRACH Narrowband Physical Random Access Channel
OFDM Orthogonal Frequency Division Multiplexing
PDCCH Physical Downlink Control Channel
PDSCH Physical Downlink Shared Channel
PRB Physical Resource Block
PSTN Public Switched Telephone Network
PUSCH Physical Uplink Shared Channel
PUCCH Physical Uplink Control Channel
PRACH Physical Random Access Channel
RA-RNTI Random Access-Radio Network Temporary Identifier
RB Resource Block
RNC Radio Network Controller
RRC Radio Resource Control
RRH Remote Radio Head
RRU Remote Radio Unit
TDD Time Division Duplex
TS Technical Specification
UE User Equipment
UL Uplink
WAN Wide Area Network

The invention claimed is:

1. A method in a network node, the method comprising:
reserving, within a Narrowband Physical Random Access Channel (NPRACH) resource comprising a plurality of start subcarriers, a subset of the plurality of start subcarriers for performing a contention-free random access procedure; and
communicating, to one or more user equipment (UEs), information indicating which of the plurality of start subcarriers within the NPRACH resource are reserved for performing the contention-free random access procedure;
wherein the information indicating which of the plurality of start subcarriers within the NPRACH resource are reserved for performing the contention-free random access procedure comprises a number of start subcarriers within the NPRACH resource that are not reserved for performing the contention-free random access procedure.

2. The method of claim 1, wherein the start subcarriers within the NPRACH resource that are not reserved for performing the contention-free random access procedure are available for performing a contention-based random access procedure.

3. The method of claim 1, wherein the information is signaled as part of a radio resource control information element.

4. The method of claim 1, wherein:
each of the plurality of start subcarriers within the NPRACH resource is a first subcarrier for a subcarrier hopping sequence.

5. The method of claim 1, comprising:
communicating, to a first UE, an instruction to use a particular one of the reserved start subcarriers for performing the contention-free random access procedure.

6. The method of claim 1, wherein:
the information indicating which of the plurality of start subcarriers within the NPRACH resource are reserved for performing the contention-free random access procedure comprises a number of reserved start subcarriers.

7. A method in a user equipment (UE), comprising:
receiving, from a network node, information indicating which of a plurality of start subcarriers within a Narrowband Physical Random Access Channel (NPRACH) resource are reserved for performing a contention-free random access procedure; and
performing a random access procedure based on the received information;
wherein the start subcarriers that are reserved for performing the contention-free random access procedure comprise a subset of the plurality of start subcarriers within the NPRACH resource; and
wherein one or more start subcarriers that are not in the reserved subset are available for performing a contention-based random access procedure.

8. The method of claim 7, wherein:
the information indicating which of the plurality of start subcarriers within the NPRACH resource are reserved for performing the contention-free random access procedure comprises a number of the one or more start subcarriers that are not in the reserved subset.

9. The method of claim 8, comprising:
determining which of the plurality of start subcarriers are reserved for performing the contention-free random access procedure based on the number of the one or more start subcarriers that are not in the reserved subset.

10. The method of claim 8, comprising:
selecting a first start subcarrier from among the one or more start subcarriers that are not in the reserved subset; and
wherein performing the random access procedure based on the received information comprises performing a contention-based random access procedure using the selected first start subcarrier.

11. The method of claim 7, comprising:
receiving, from the network node, an instruction to use a particular one of the reserved start subcarriers for performing a contention-free random access procedure; and
wherein performing the random access procedure based on the received information comprises performing the contention-free random access procedure using the particular one of the reserved start subcarriers.

12. The method of claim 7, wherein:
the information indicating which of the plurality of start subcarriers within the NPRACH resource are reserved for performing the contention-free random access procedure comprises a number of reserved start subcarriers.

13. The method of claim 7, wherein the information is received in a radio resource control information element.

14. The method of claim 7, wherein:
each of the plurality of start subcarriers within the NPRACH resource is a first subcarrier for a subcarrier hopping sequence.

15. A network node, comprising:
processing circuitry, the processing circuitry configured to:
reserve, within a Narrowband Physical Random Access Channel (NPRACH) resource comprising a plurality of start subcarriers, a subset of the plurality of start subcarriers for performing a contention-free random access procedure; and
communicate, to one or more user equipment (UEs), information indicating which of the plurality of start subcarriers within the NPRACH resource are reserved for performing the contention-free random access procedure;
wherein the information indicating which of the plurality of start subcarriers within the NPRACH resource are reserved for performing the contention-free random access procedure comprises a number of start subcarriers within the NPRACH resource that are not reserved for performing the contention-free random access procedure.

16. The network node of claim 15, wherein the start subcarriers within the NPRACH resource that are not reserved for performing the contention-free random access procedure are available for performing a contention-based random access procedure.

17. The network node of claim 15, wherein the information is signaled as part of a radio resource control information element.

18. The network node of claim 15, wherein:
each of the plurality of start subcarriers within the NPRACH resource is a first subcarrier for a subcarrier hopping sequence.

19. The network node of claim 15, where the processing circuitry is configured to communicate, to a first UE, an instruction to use a particular one of the reserved start subcarriers for performing the contention-free random access procedure.

20. The network node of claim 15, wherein:
the information indicating which of the plurality of start subcarriers within the NPRACH resource are reserved for performing the contention-free random access procedure comprises a number of reserved start subcarriers.

21. A user equipment (UE), comprising:
processing circuitry, the processing circuitry configured to:
receive, from a network node, information indicating which of a plurality of start subcarriers within a Narrowband Physical Random Access Channel (NPRACH) resource are reserved for performing a contention-free random access procedure; and
perform a random access procedure based on the received information;
wherein the start subcarriers that are reserved for performing the contention-free random access procedure comprise a subset of the plurality of start subcarriers within the NPRACH resource; and
wherein one or more start subcarriers that are not in the reserved subset are available for performing a contention-based random access procedure.

22. The UE of claim 21, wherein:
the information indicating which of the plurality of start subcarriers within the NPRACH resource are reserved for performing the contention-free random access procedure comprises a number of the one or more start subcarriers that are not in the reserved subset.

23. The UE of claim 22, wherein the processing circuitry is configured to:
determine which of the plurality of start subcarriers are reserved for performing the contention-free random access procedure based on the number of the one or more start subcarriers that are not in the reserved subset.

24. The UE of claim 22, wherein:
the processing circuitry is configured to select a first start subcarrier from among the one or more start subcarriers that are not in the reserved subset; and
the processing circuitry configured to perform the random access procedure based on the received information comprises processing circuitry configured to perform a contention-based random access procedure using the selected first start subcarrier.

25. The UE of claim 21, wherein:
the processing circuitry is configured to receive, from the network node, an instruction to use a particular one of the reserved start subcarriers for performing a contention-free random access procedure; and
the processing circuitry configured to perform the random access procedure based on the received information comprises processing circuitry configured to perform the contention-free random access procedure using the particular one of the reserved start subcarriers.

26. The UE of claim 21, wherein:
the information indicating which of the plurality of start subcarriers within the NPRACH resource are reserved for performing the contention-free random access procedure comprises a number of reserved start subcarriers.

27. The UE of claim 21, wherein the information is received in a radio resource control information element.

28. The UE of claim 21, wherein:
 each of the plurality of start subcarriers within the NPRACH resource is a first subcarrier for a subcarrier hopping sequence.

\* \* \* \* \*